No. 715,629. Patented Dec. 9, 1902.
E. W. WAINWRIGHT.
CASTER.
(Application filed June 23, 1902.)
(No Model.)
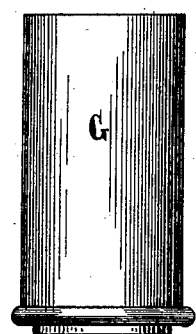
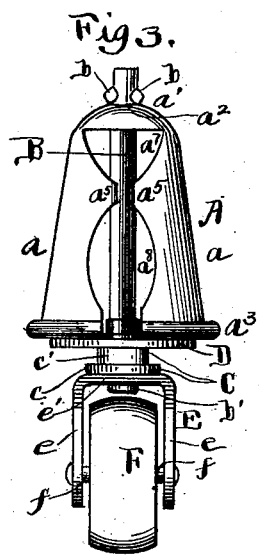
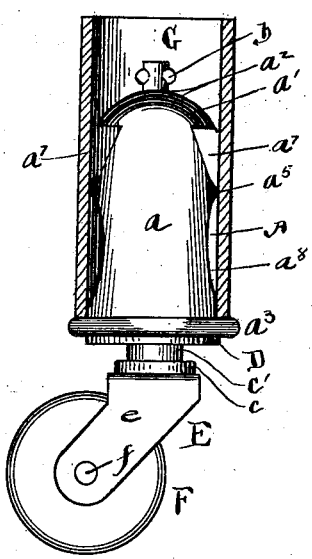
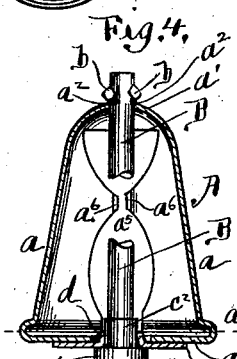
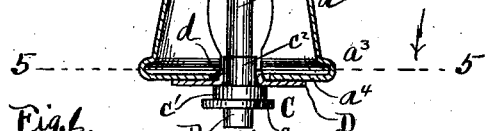
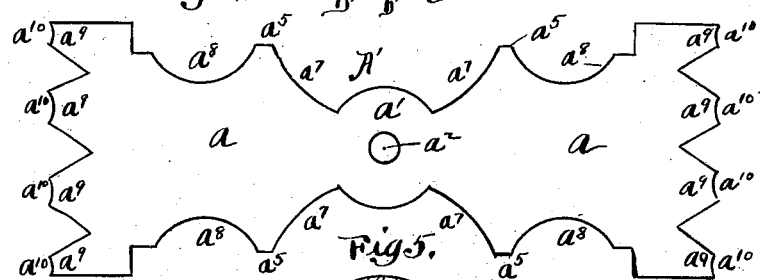
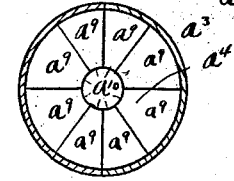
Witnesses
Samuel W. Banning
Walker Banning
Inventor
Edward W. Wainwright.
By Banning & Banning,
Attys.
THE NORRIS PETERS CO., PHOTO-LITHO., WASHINGTON, D. C.

UNITED STATES PATENT OFFICE.

EDWARD W. WAINWRIGHT, OF MORRIS, ILLINOIS.

CASTER.

SPECIFICATION forming part of Letters Patent No. 715,629, dated December 9, 1902.

Application filed June 23, 1902. Serial No. 112,842. (No model.)

*To all whom it may concern:*

Be it known that I, EDWARD W. WAINWRIGHT, a citizen of the United States, residing at Morris, in the county of Grundy and State of Illinois, have invented a certain new and useful Improvement in Casters, of which the following is a specification.

This invention relates to a construction and application of friction-plate or spring-retainers for maintaining a caster in its socket or receiving member, and has for its objects the construction of the friction-plate or spring-retainer from a single sheet or strip of metal in such manner as to give the requisite outward pressure for holding the caster in place when inserted and to furnish a firm bearing against side tipping of the caster in use; to furnish an annular track or contact for the caster and its socket, one section of which track or contact is formed with the friction-plate or retainer; to cheapen the cost of manufacture and produce an efficient and reliable connection and support between the caster and its socket, and to improve generally the construction and operation of the caster as a whole in regard to the friction-plate or spring-retainer and its attachment in position.

The invention consists in the features of construction and combinations of parts hereinafter described and claimed.

In the drawings, Figure 1 is a side elevation showing the caster of the invention inserted in its socket or receiving member; Fig. 2, a sectional elevation of Fig. 1, showing the socket or receiving member in section; Fig. 3, an elevation of the caster and the friction-plate or spring-retainer expanded to its limit and removed from the socket or receiving member; Fig. 4, a detail showing the friction-plate or spring-retainer in section and showing the stem of the caster in elevation and broken out with the caster-wheel and its frame or stirrup removed; Fig. 5, a cross-section on line 5 of Fig. 4 looking in the direction of the arrow and showing the formation of the bottom or lower end of the friction-plate or spring-retainer, and Fig. 6 a plan view of the blank from which the friction-plate or spring-retainer is formed.

The friction-plate or spring-retainer A is made from a blank A' of a formation shown in Fig. 6. The blank is of sheet metal, having the necessary resiliency or spring for the operation of the friction-plate or spring-retainer in use. This blank has on each side of its center a leaf $a$, extending out from a disk or circular center $a'$, in which is a hole $a^2$ of the diameter for the passage of the pintle or stem of the caster. Each side edge of each leaf is cut away to form on each side of the disk center a curved edge $a^7$, terminating in a point $a^5$, extending from which is a curved edge $a^8$, and the end of each leaf $a$ is cut out to leave points $a^9$, with curved edges $a^{10}$. This blank is pressed into shape to have the leaves $a$ form the side walls of the friction-plate or spring-retainer, as shown in Figs. 2, 3, and 4, and to have the circular disk $a'$ form the head of the friction-plate or spring-retainer, through which passes the pintle or stem of the caster. The extreme end of the blank A' is pressed or forced outward to form a ledge or shoulder $a^3$, and the inwardly-turned ends $a^9$ form a track or bearing-face for the retainer when in position. Each point $a^5$ is inwardly turned to form lips $a^6$, which when the leaves or side walls are sprung toward each other come in contact and prevent the points or stops from passing each other and interfering with the outward force or pressure exerted by the side leaves or walls of the retainer. The side leaves or walls when the retainer is normal are spread apart, as shown in Figs. 3 and 4, so that enough play is provided for the contraction of the retainer for insertion in its socket or receiving member, in which it is held by the outward spring or pressure exerted by the side leaves or walls.

The upper end of the stem or pintle B is passed through the hole $a^2$ and extends some distance above the top or head $a'$ of the friction-plate or spring-retainer in the construction shown, and, as shown, the stem or pintle is held against withdrawal by side lugs or projections $b$, struck from the stem or pintle, to engage the top or head around the edge of the hole $a^2$, through which the stem or pintle passes, but the stem or pintle could be otherwise held in place. The lower end of the stem or pintle extends below the track $a^4$ and, as shown, has thereon a stop C in the form of a flange $c$ and a ring $c'$, with an extension $c^2$ of a less diameter than the ring and extending from the ring, which extension passes through the hole formed by the circular edges $a^{10}$ of the points $a^9$ when turned inward to form the track, as shown in Fig. 5.

A circular disk or washer D, having a central hole with a turned edge or lip $d$, encircles the extension $c^2$ of the stop C and forms the track or bearing-face to coact with the track or bearing-face $a^4$ when the parts are assembled and the caster is inserted in its socket or receiving member for use. The extreme end $b'$ of the stem or pintle extends through the top bar or cross-piece $e'$ of the frame or stirrup E, with the stop C abutting against the top bar or cross-piece of the stirrup or frame, and the pintle is firmly secured to the stirrup or frame by upsetting or riveting down the end $b'$ or in any other suitable manner. The stirrup or frame E has mounted in its side arms $e$ the caster-wheel F, which is supported on a journal $f$, secured in the arms, as usual. The socket or receiving member G can be the hollow post of a bedstead or similar post for other articles of furniture or any suitable thimble or tube for the reception of the caster.

It is to be understood that the stem or pintle, the stop thereon, the frame or stirrup, and the wheel are first assembled and united, the track D is slipped onto the stem or pintle to encircle the extension of the stop, and the friction-plate or spring-retainer is slipped onto the stem or pintle for the track thereof to coact with the track D, and the projecting end of the stem or pintle has the lugs formed thereon or otherwise operated upon to retain the stem or pintle in and surrounded by the friction-plate or spring-retainer, thus assembling the device as a whole ready for use.

In use the friction-plate or spring-retainer is forced into its socket or receiving member, such operation being permitted by the resiliency or spring of the side leaves or walls, and when in place the end wall of the socket or receiving member abuts against the shoulder or ledge $a^3$ for the shoulder or ledge to furnish a support for the socket or receiving member, and the tracks $a^4$ and D are in contact, thus giving the caster as a whole and its socket or receiving member a continuous bearing or support, one track of which is furnished by and integral with the friction-plate or spring-retainer, rendering the support more solid and firm than would be the case with a track-section independent of the friction-plate or spring-retainer. The diameter of the friction-plate or spring-retainer when inserted should be one by which the body of the leaves or side walls above the shoulder or ledge $a^3$ are in full contact with the inner face of the wall of the socket or receiving member, and the stops $a^5$ are also in contact with the inner wall of the socket or receiving member, thus furnishing a contact at the bottom and sufficiently near the top for the friction-plate or spring-retainer, by which such retainer will be held against lateral swing or play at its upper end, thus maintaining the position of the caster in its socket or receiving member in proper alinement for producing the best results. The outward force or spring of the side leaves or walls is sufficient to hold the caster in its socket or receiving member after it is entered therein against displacement in the ordinary use of the article to which the caster is applied, as in order to remove the caster sufficient force will have to be applied to overcome the resistance furnished by the outward spread or spring of the friction-plate or retaining-spring. The friction-plate or retaining-spring, made from a single blank folded on itself to form the top or head and the side leaves or walls, with the engaging shoulder or ledge at the lower end of the leaves or walls, is readily formed into shape and when formed is of a nature to furnish the necessary friction or outward bearing for retaining the caster in place, and at the same time the resiliency of the retainer admits of its being easily and readily inserted in position. The caster as a whole can be inserted in place without the requirement of any special skill, and when inserted the caster will be retained in position without liability of falling out in raising the article to which it is applied and yet capable of easy withdrawal when required. These features of the invention result in the construction of a caster which as a whole is simple in form, easily manufactured, and which will be found efficient and reliable in use.

What I regard as new, and desire to secure by Letters Patent, is—

1. A blank for making a friction-plate or retainer-spring for casters and having a circular disk or center and an endwise-extending leaf on each side of the disk or center, each leaf cut out on both its side edges to furnish edge contacts or stops, and the circular disk or center having a central hole, each leaf having its outer end wider than its body and adapted to be grooved or beaded to form a shoulder or ledge, and the edge of each end notched to furnish inwardly-curved contact edges, substantially as described.

2. In a caster, a stem or pintle, a friction-plate or spring-retainer made from a single strip of resilient material bent to have a top or head, a tubular body formed of independent side leaves or walls, each side leaf or wall having at its lower end a shoulder or ledge and an inwardly-turned end fitting around the stem or pintle and furnishing a track or bearing-plate, and a loose disk or plate provided on its inner edge with an upwardly-turned annular flange extending up between and separating the inner edge of the inwardly-turned end from the stem or pintle, and having its upper face in contact with the lower face of the inwardly-turned end, thereby reinforcing the same, substantially as described.

3. In a caster, a stem or pintle, a friction-plate or spring-retainer made from a single strip of resilient material bent to have a top or head provided with a hole through which the pintle projects, a tubular body formed of independent side leaves or walls, each side leaf or wall having at its lower end a shoulder or ledge, and an inwardly-turned end fitting around the stem or pintle and furnishing a track or bearing-plate, a loose disk or plate provided on its inner edge with an upwardly-turned annular flange extending up between the inner edge of the inwardly-turned end and the pintle, and having its upper face in contact with the lower face of the inwardly-turned end, thereby reinforcing the same, and a collar on the pintle below the disk contacting therewith, substantially as described.

4. In a caster, a stem or pintle provided with an extension $c^2$, a friction-plate or spring-retainer made from a single strip of resilient material bent to have a top or head, a tubular body formed of independent side leaves or walls, each side leaf or wall cut away on both edges at two places, leaving a projection forming a stop to contact with the oppositely-disposed projection and limit the inward retraction of the leaves or walls, and each side leaf or wall having at its lower end a shoulder or ledge and an inwardly-turned end composed of segments furnishing a track or bearing-plate, a loose disk or plate encircling the pintle and provided on its inner edge with an upwardly-turned annular flange encircling the shoulder $c^2$ on the stem or pintle and having its upper face in contact with the inwardly-turned segmental ends of the leaves, and a collar on the pintle below the disk contacting therewith, substantially as described.

EDWARD W. WAINWRIGHT.

Witnesses:
THOMAS A. BANNING,
OSCAR W. BOND.